United States Patent [19]

Cuenot et al.

[11] Patent Number: 5,091,668
[45] Date of Patent: Feb. 25, 1992

[54] MOTOR HAVING FLUX-CONCENTRATING PERMANENT MAGNETS

[75] Inventors: Alain Cuenot; Bouziane Bendahmane, both of Dijon, France

[73] Assignee: GEC ALSTHOM SA, Paris, France

[21] Appl. No.: 625,192

[22] Filed: Dec. 10, 1990

[30] Foreign Application Priority Data

Dec. 8, 1989 [FR] France .................. 8916251

[51] Int. Cl.$^5$ ........................................... H02K 21/12
[52] U.S. Cl. ........................................ 310/156; 310/91;
310/181; 310/217; 310/218
[58] Field of Search ..................... 310/216-218,
310/156, 261, 265, 91, 42, 264, 181, 265, 270;
464/29; 336/210

[56] References Cited

U.S. PATENT DOCUMENTS

| | | | |
|---|---|---|---|
| 2,680,822 | 6/1954 | Brainard | 310/261 |
| 3,659,129 | 4/1972 | Pettersen | 310/216 |
| 4,127,786 | 11/1978 | Volkrodt | 310/156 |
| 4,403,161 | 9/1983 | Miyashita | 310/156 |

FOREIGN PATENT DOCUMENTS 0107317 5/1984 European Pat. Off. .
0327470 8/1989 European Pat. Off. .

OTHER PUBLICATIONS

Patent Abstracts of Japan, vol. 12, No. 476 (E-693)(3323) Dec. 13, 1988, & JP-A-63 194550 (FANUC) Aug. 11, 1988.

*Primary Examiner*—R. Skudy
*Attorney, Agent, or Firm*—Sughrue, Mion, Zinn, Macpeak & Seas

[57] ABSTRACT

A motor having flux-concentrating permanent magnets, the motor including a stator with windings and a rotor including a shaft, a sleeve surrounding the shaft for holding rotor laminations, and permanent magnets. The motor being characterized in that said sleeve is constituted by unitary sleeves (2) separated by disks (5), the sleeves and the disks being clamped together by tie bars (6) connected to at least one end cheek plate (7) which is fixed to the shaft (1).

8 Claims, 3 Drawing Sheets

5,091,668

MOTOR HAVING FLUX-CONCENTRATING PERMANENT MAGNETS

FIELD OF THE INVENTION

The present invention relates to a motor having flux-concentration permanent magnets.

BACKGROUND OF THE INVENTION

The closest prior art in this field is provided by Document EP-A-0 327 470.

That document describes the rotor of a rotary electrical machine having permanent magnets of the flux-concentrating type in which the rotor includes a sleeve of non-magnetic material having the drive shaft passing therethrough and fixed to the drive shaft, with fixing being achieved by knurling on the drive shaft co-operating with the surface of the sleeve of non-magnetic material which is a force-fit on the drive shaft.

With a structure of this type, the sleeve is subjected to stresses that exceed the elastic limits of the usable non-magnetic materials. As a result, after a short period of time, play arises that may lead to the motor being damaged. This phenomenon is accentuated by high speeds, such that the prior art motor is unsuitable for operation at such speeds. Further, the differences between the expansion coefficients of non-magnetic and magnetic materials gives rise to unacceptable positive assembly clearances due to the inevitable heating of the motor in operation.

An object of the present invention is to provide a motor in which the rotor avoids the above-mentioned drawbacks.

Another object is to provide a motor of modular type so as to make it possible to build up motors with powers extending over a large range by assembling together a greater or lesser number of the same mechanical components.

Another object of the invention is to provide a motor which is optimized electromagnetically while still retaining a high degree of robustness, in particular at high speeds.

SUMMARY OF THE INVENTION

All of these objects are achieved by the invention which provides a motor having flux-concentrating permanent magnets, the motor comprising a stator with windings and a rotor comprising a shaft, a sleeve surrounding the shaft for holding rotor laminations, and permanent magnets, the motor being characterized in that said sleeve is constituted by unitary sleeves separated by disks, the sleeves and the disks being clamped together by tie bars connected to at least one end cheek plate which is fixed to the shaft.

Preferably, the unitary sleeves are made by stacking laminations cut out from non-magnetic material and preassembled.

According to another characteristic of the invention, the unitary sleeves have respective plane bearing surfaces for the permanent magnets.

According to another characteristic of the invention, the unitary sleeves have facing pairs of surfaces of plane or arbitrary profile for holding the packet of rotor laminations radially by co-operating with pairs of complementary surfaces presented thereby.

Advantageously, the disks are made of a non-magnetic material such as non-magnetic steel.

In a preferred embodiment, the unitary sleeves surround the shaft with a small amount of clearance.

In a variant, the unitary sleeves surround the shaft with a small amount of clearance and are fixed thereto by means of tolerance rings.

BRIEF DESCRIPTION OF THE DRAWINGS

The invention will be well understood from the description given below of a preferred embodiment of the invention, which description is made with reference to the accompanying drawings, in which.

DETAILED DESCRIPTION OF THE PREFERRED EMBODIMENTS

In the figures, reference 1 designates the shaft or the motor; a sleeve is slid over the shaft to support rotor laminations 3.

According to a characteristic of the invention, this sleeve is made by juxtaposing a plurality of unitary sleeves 2, with the unitary sleeves being of a given length, thereby making it possible to make them cheaply by producing large numbers thereof. The motor of the invention is modular in the sense that motors of different powers can be made by placing an appropriate number of unitary sleeves on a shaft, with this number lying in the range one to ten, for example. Thus, the same components (rotor laminations, magnets, etc., . . . ) can be used to obtain a range of motors with powers lying between 1 to 10 times a given unitary power.

Figure 3:
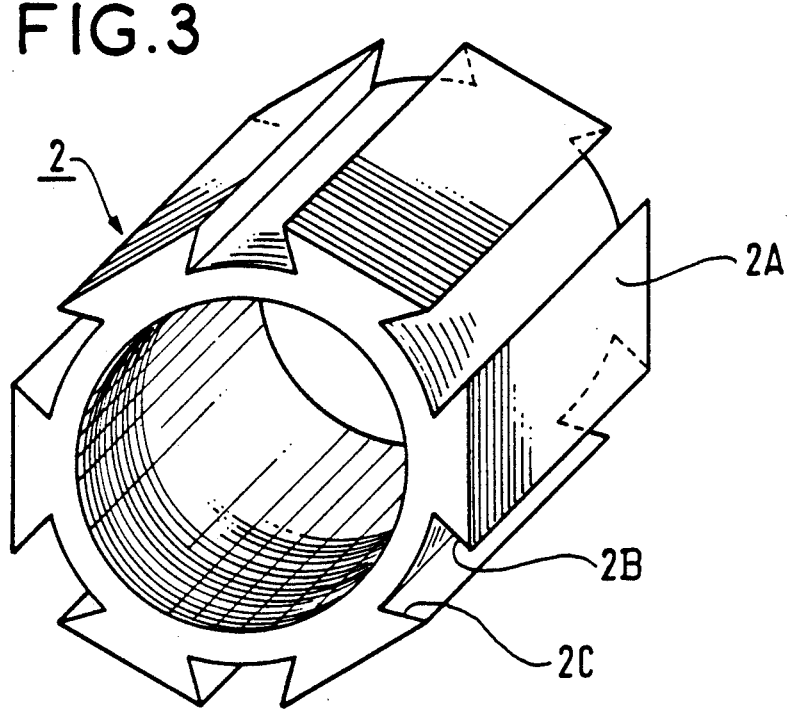
FIG. 3 is a perspective view of a unit sleeve of a preferred embodiment.

As shown in FIG. 3, the unitary sleeves are preferably constituted by laminations that are cut out and assembled in packets, in which each lamination is subjected to a small semi-cutout deformation creating a recess in one face and a projection on the other. To build up a packet, the laminations are assembled so that the projections of the laminations are received in the recesses of adjacent laminations.

This method of making a sleeve is the cheapest, but, in a variant, it would be possible to make sleeves by extrusion.

The material selected for extruded sleeves should be a non-magnetic metal or alloy such as aluminum or an alloy based on aluminum.

It can be seen that any grooving or knurling of the shaft or of the sleeve is avoided. It is explained below how the sleeves are fixed to the shaft.

According to another characteristic of the invention, the sleeves 2 have plane bearing surfaces 2A for permanent magnets. There are as many bearing surfaces as the motor has poles.

In addition, for each pole, the sleeves have two facing surfaces 2B and 2C which are plane and of dovetail profile for holding rotor laminations and which are complementary to corresponding dovetail profiles of the pole. It is shown below that this disposition suffices for the purpose of holding the rotor laminations 3 providing they have two surfaces complementary to the surfaces 2B and 2C.

Advantageously, the rotor laminations 3 are made up of packets having the same thickness as the sleeves.

Permanent magnets 4 are disposed in conventional manner in housings constituted by the rotor laminations 3 and the sleeves 2.

According to another characteristic of the invention, disks 5 are disposed between the packets of laminations and abutting the unitary sleeves and co-operate with assembly tie rods 6. These disks are preferably made of non-magnetic material and serve as stiffeners for the assembly tie rods and prevent them from bending excessively.

The number of tie rods 6 is preferably equal to the number of poles.

The tie rods 6 serve to clamp the packets of rotor laminations between two cheek plates 7 and 8. Each tie rod 6 is preferably screwed into a tapped bore 7a in cheek plate 7 and is clamped against cheek plate 8 by means of a nut 9.

The cheek plates 7 and 8 are preferably made of non-magnetic material, and preferably of a non-magnetic steel.

Driving torque is transmitted to the shaft by the tie rods 6 and the cheek plate 7 which is fixed to a ring 10, itself hot shrunk onto the shaft and also keyed thereto.

This disposition (which ensures that the driving torque is properly transmitted to the shaft) makes assembly of the motor very easy since the sleeves are not force-fitted on the shaft and are therefore neither grooved nor knurled.

Figure 1:
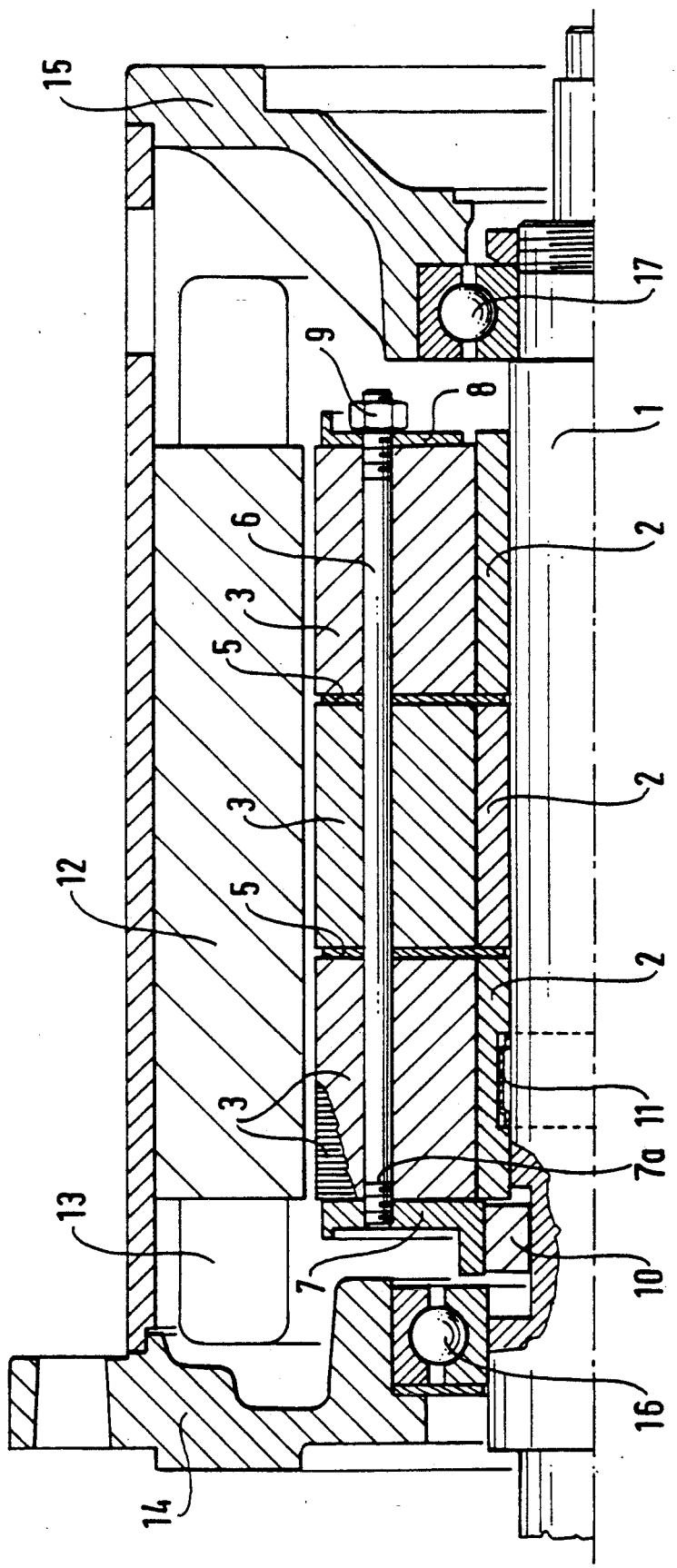
FIG. 1 is an axial half-section through a six-pole motor of the invention.
Figure 2:
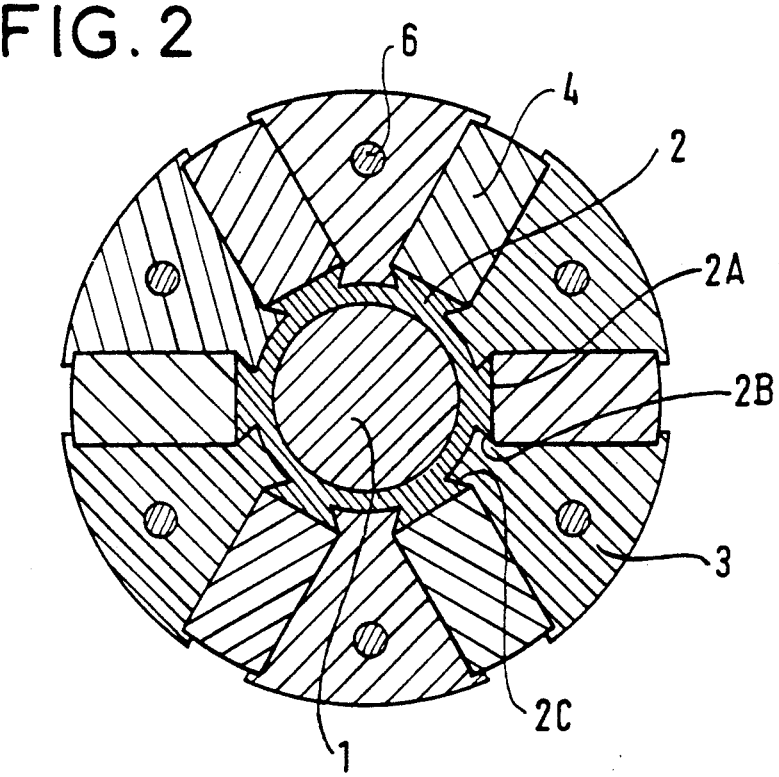
FIG. 2 is a cross-section view of the rotor of the same motor.
Figure 4:
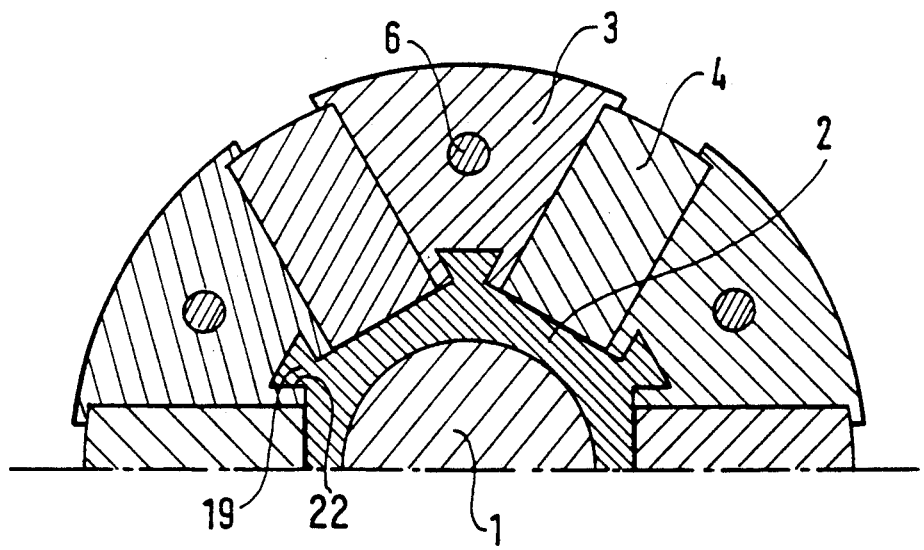
FIG. 4 is a fragmentary diagrammatic view in cross-section through the rotor of a motor according to a variant embodiment of the invention.

As shown in FIG. 4, it may be observed that it is possible to use an assembly in which the sleeve 2 has tenons 19 that co-operate with complementary mortises 22 in the rotor laminations (i.e. their profiles are the opposite way round to those of the embodiment of FIGS. 1 to 3).

Figure 5:
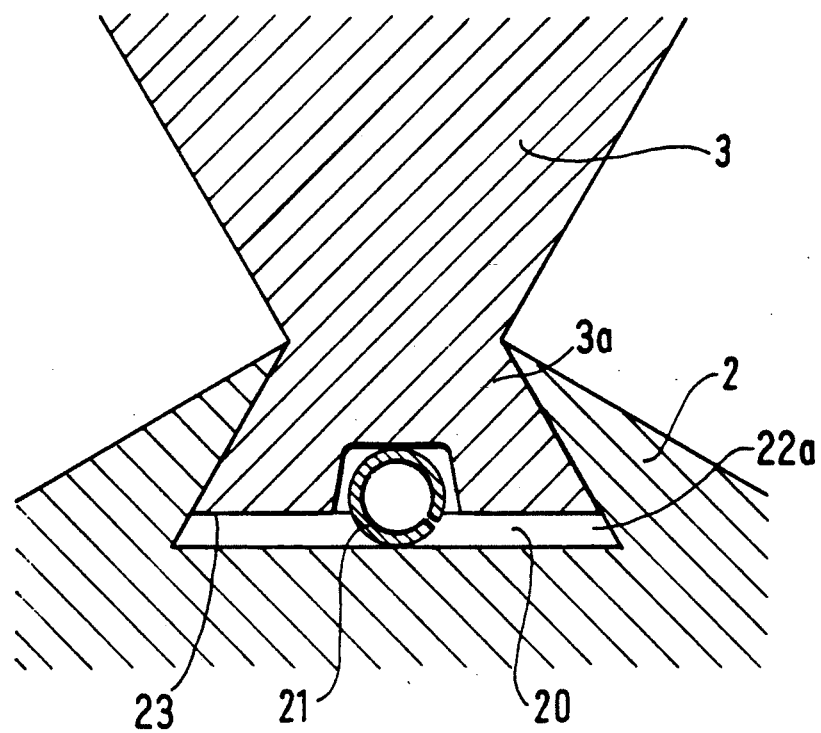
FIG. 5 is a fragmentary diagrammatic view in cross-section through a rotor of a motor showing the use of clearance-eliminating devices.

FIG. 5 shows an embodiment of the type shown in FIGS. 1 to 3 in which the clearance between a packet or rotor laminations 3 and the sleeve 2 at dovetail connections therebetween is taken up by resilient pins 21, e.g. of the coiled interposed between the bottom of the mortise 22a and the radial inner surface 23 of tenon 3a of rotor lamination 3.

It can also be seen that the rotor laminations are properly held in the axial direction, and that the above-mentioned complementary surfaces of the sleeves and of the laminations suffice for holding the rotor laminations in the radial direction.

Optionally, it is possible to provide a fixing device 11 of the tolerance ring type between each sleeve and the shaft, e.g. a device known under the name "Star" ring.

Such rings do not necessarily require longitudinal grooves for assembly purposes, but they do require transverse grooves to be formed either on the shaft or in the bores of the sleeves.

The other parts of the motor are made in conventional manner: FIG. 1 shows a stator having a magnetic circuit 12 and windings 13, endplates 14 and 15, and bearings 16 and 17.

We claim:

1. In a motor comprising flux-concentrating permanent magnets, a stator with windings and a rotor comprising a shaft, a sleeve surrounding the shaft, holding rotor laminations and said permanent magnets being supported by said rotor laminations, the improvement wherein said sleeve is constituted by a plurality of axially aligned unitary sleeves (2) abutting and separated by disks (5), and tie bars (6) connected to at least one end cheek plate (7) fixed to the shaft (1) clamping the sleeves and disks together.

2. A motor according to claim 1, wherein the unitary sleeves (2) are preassembled stacked laminations of non-magnetic metal.

3. A motor according to claim 1, wherein the unitary sleeves (2) have respective plane bearing surfaces (2A) abutting said permanent magnets.

4. A motor according to claim 2, wherein the unitary sleeves (2) have facing parts of surfaces of plane, dovetail profile (2B, 2C) for holding packets of laminations radially engaging respective pairs of complementary dovetail surfaces of said packets of laminations.

5. A motor according to claim 1, wherein the disks (5) are made of a non-magnetic steel.

6. A motor according to claim 1, wherein the unitary sleeves (2) surround the shaft (1) with a small amount of clearance.

7. A motor according to claim 1, wherein the unitary sleeves (2) surround the shaft (1) with a small amount of clearance therebetween and are fixed thereto by means of tolerance rings (11) interposed radially between the shaft and the unitary sleeves.

8. A motor according to claim 1, wherein a clearance (20) between the rotor laminations (3) thereof and the sleeve (2) is taken up by resilient pins interposed between bottom of mortises and radial inner surface of tenons of said rotor laminations.

* * * * *